(12) United States Patent
May et al.

(10) Patent No.: US 7,036,029 B2
(45) Date of Patent: Apr. 25, 2006

(54) CONSERVING POWER OF A SYSTEM ON A CHIP USING SPEED SENSING

(75) Inventors: Marcus W. May, Austin, TX (US); Daniel Mulligan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 455 days.

(21) Appl. No.: 10/607,960

(22) Filed: Jun. 27, 2003

(65) Prior Publication Data
US 2004/0268165 A1    Dec. 30, 2004

(51) Int. Cl.
*G06F 1/32* (2006.01)
(52) U.S. Cl. ........................ 713/320; 702/107
(58) Field of Classification Search ............... 713/320, 713/300; 702/96, 107, 176; 716/4; 324/600
See application file for complete search history.

(56) References Cited

U.S. PATENT DOCUMENTS

| 6,014,749 A * | 1/2000 | Gloor et al. ................ 713/300 |
| 6,601,177 B1 * | 7/2003 | Fujigaya et al. ............ 713/300 |
| 6,895,520 B1 * | 5/2005 | Altmejd et al. ............. 713/324 |

* cited by examiner

*Primary Examiner*—William M. Treat
(74) *Attorney, Agent, or Firm*—Garlick Harrison & Markison LLP; Timothy W. Markison (57) ABSTRACT

A method for conserving power begins by measuring processing speed of at least a portion of an integrated circuit (IC) to produce measured processing speed. The portion of the IC may be a test circuit, a critical path of the IC, and/or a replica of the critical path of the IC. The processing continues by comparing the measured processing speed with a critical processing speed for the at least a portion of the integrated circuit. The processing then continues by adjusting supply voltage to the integrated circuit to reduce power consumption of the integrated circuit when the measured processing speed compares favorably to the critical processing speed.

21 Claims, 4 Drawing Sheets

FIG. 1

FIG. 2
multiple function battery operated device 60

FIG. 3
power conserving circuit 92

CONSERVING POWER OF A SYSTEM ON A CHIP USING SPEED SENSING

BACKGROUND OF THE INVENTION

1. Technical Field of the Invention

This invention relates generally to portable electronic equipment and more particularly to a multi-function handheld device and a battery-optimized system-on-a-chip used therein.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, such handheld devices use a battery (or batteries) to supply power to the circuitry of the device. The more power the circuitry consumes, the shorter the battery life (i.e., how long the device can be operated before having to replace or charge the battery). Several techniques have been developed to reduce power consumption of battery-powered circuitry. One technique is to turn off circuitry that is not needed to support the present function and to put the device in a "sleep" mode when the entire device is not in use. Another technique relates to improvements in integrated circuit fabrication, which allow for smaller devices to be developed and to operating at lower voltages, thus consuming less power. For example, 0.18 micron CMOS integrated circuit technology is currently the most popular process, which uses supply voltages of 1.8 volts. Just a few years ago, however, 0.35 micron and 0.50 micron CMOS IC technology were the most popular processes, which used supply voltages of about 3.3 volts. In the near future, 0.10 and 0.13 micron CMOS IC technology will most likely become the technology of choice, which use supply voltages of about 1.0 volts. While these techniques work to reduce power consumption, they are not optimized on a chip-by-chip basis, but are designed based on worst-case operation of the integrated circuit. As such, a majority of the integrated circuit circuits are consuming more power than necessary, since the power reducing techniques are worst-case based and not individually established.

Yet further, many handheld devices include an external memory interface to couple to external memory, such as a memory stick, flash memory, etc. The memory interface typically includes a state machine that is programmed to process the reading to and writing from the external memory in accordance with a standardized memory access protocol. As is known, many external memory devices use a standardized memory access protocol, however, recently some manufacturers have deviating from the standardized memory access protocol. The non-standard external memories offer some advantages over the standardized memories, thus are desirable for use with the handheld devices. However, the memory interface state machine is not capable of processing the memory access requests for non-standard memory. Thus, a handheld device would require multiple state machines to process memory access requests with standard and non-standard memories.

Therefore, a need exists for an integrated circuit that provides multiple functions for handheld devices with optimized power consumption and with a minimal requirement of external components.

BRIEF SUMMARY OF THE INVENTION

The conserving power of a system-on-a-chip using speed sensing of the present invention substantially meets these needs and others. In one embodiment, a method for conserving power begins by measuring processing speed of at least a portion of an integrated circuit (IC) to produce measured processing speed. The portion of the IC may be a test circuit, a critical path of the IC, and/or a replica of the critical path of the IC. The processing continues by comparing the measured processing speed with a critical processing speed for the at least a portion of the integrated circuit. The processing then continues by adjusting supply voltage to the integrated circuit to reduce power consumption of the integrated circuit when the measured processing speed compares favorably to the critical processing speed. With such a method, power consumption is optimized on an IC-by-IC basis such that power consumption of each IC is optimized.

DETAILED DESCRIPTION OF THE INVENTION

Figure 1:
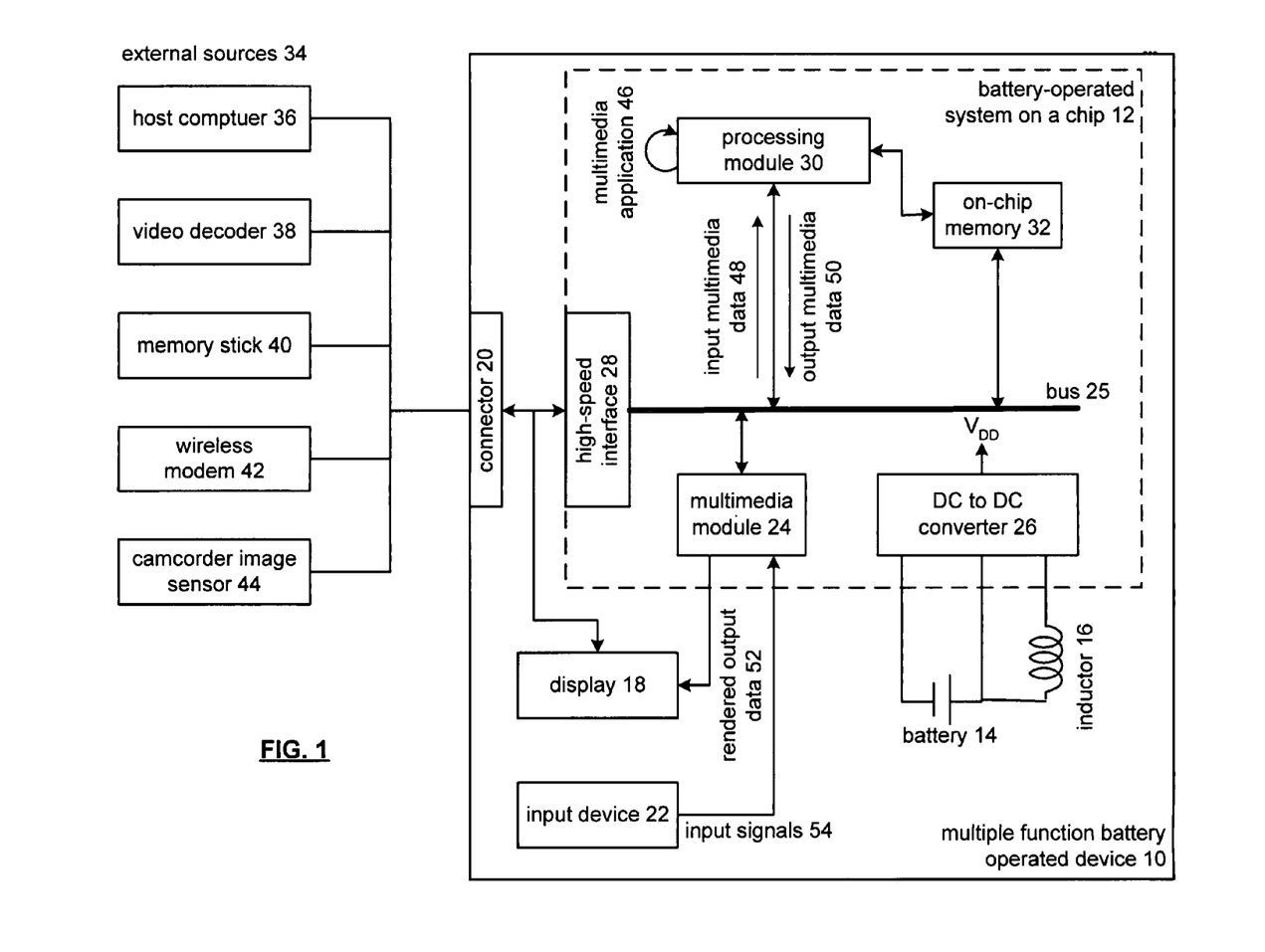
FIG. 1 is a schematic block diagram of a multiple function battery operated device that includes a battery-optimized system-on-a-chip in accordance with the present invention.

FIG. 1 is a schematic block diagram of a multiple function battery operated device 10 that includes a battery-optimized system-on-a-chip 12, a battery 14, an inductor 16, a display 18, a connector 20, and an input device 22. The connector 20 provides coupling between the battery-optimized system-on-a-chip 12 and an external source 34, which may be a host computer 36, a video decoder 38, a memory stick 40, a wireless modem 42, a camcorder image sensor 44. The battery-optimized system-on-a-chip 12 includes a multimedia module 24, a high-speed interface 28, a processing module 30, on-chip memory 32, and an on-chip DC-to-DC converter 26. In general, the multiple function battery operated device 10 may be, but is not limited to, an MP3 player/recorder, a thumb drive memory extension, a digital camera, a digital camcorder, a DVD player/recorder, video conferencing device, a personal digital assistant (PDA), a radio, a television, and/or a CD player/recorder.

The DC-to-DC converter 26 is operably coupled to the battery 14 and inductor 16 to produce at least one supply voltage (VDD). In general, the DC-to-DC converter may be a buck converter, a boost converter, a fly-back converter, a half bridge converter, and/or a full bridge converter. In one embodiment, the DC-to-DC converter is a boost converter that includes a sink transistor, at least one load transistor, and regulation circuitry. The regulation circuitry monitors the supply voltage (VDD) with respect to a reference voltage and produces therefrom a regulation signal. The regulation signal, in one phase, enables the sink transistor to build up energy in the inductor and, in another phase, enables the load transistor to transfer the energy of the inductor to the supply voltage. The DC-to-DC converter 26 may be constructed in accordance with the teaching of U.S. Pat. No. 6,204,651, entitled METHOD AND APPARATUS FOR REGULATING A DC VOLTAGE and provides the supply voltage the processing module 30, the on-chip memory 32, the high-speed interface 28, and/or the multimedia module 24. The DC-to-DC converter 26 may also provide the supply voltage off-chip to power the display 18 and/or the input device 22.

The high-speed interface 28 is operably coupled to bus 25 within the system-on-a-chip 12 and externally to the connector 20. As such, the high-speed interface 28, which may be a USB (universal serial bus) interface, a serial-to-deserial interface, or parallel interface, provides connectivity between one or more external sources 34 and the system-on-a-chip 12. For example, the host computer 36, which may be a personal computer, laptop, workstation, etc., provides digitized audio (e.g., an MP3 file, WMA—Windows Media Architecture—, MP3 PRO, Ogg Vorbis, AAC—Advanced Audio Coding, a CD file, etc.) and/or digitized video signals (e.g., an MPEG (motion picture expert group) file, a JPEG (joint photographic expert group) file, a DVD file, a video graphics file, a text file, etc.) to the high-speed interface 28. The high-speed interface 28 converts the format of the received data into a generic format of the system-on-a-chip, which is based on the type of processing module 30 and/or the type of on-chip memory 32. The high-speed interface then provides the generic formatted data to the processing module 30, the on-chip memory 32, and/or the multimedia module 24.

For instance, the digitalized audio and/or video data may be stored in the on-chip memory 32 for later playback, where the processing module 30 controls the storing of the data via a multimedia application 46. Note that processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The on-chip memory 32 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 30 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 32 stores, and the processing module 32 executes, operational instructions corresponding to multimedia applications 46 that include, but are not limited to audio playback, audio record, video playback, video record, storing text, displaying text, storing video graphics, file system transfer, and/or displaying video graphics.

The data that is stored in the on-chip memory 32 may be subsequently retrieved under the control of the processing module 30 while executing a multimedia application 46 to render the data audible and/or visible. In this instance, the processing module 30 causes the data to be retrieved from the on-chip memory 32 and to be provided to the multimedia module 24. The multimedia module 24 processes the data to produce rendered output data 52, which may include analog audio signals, digital audio signals, analog video signals, digital video signals, text, and/or video graphics, and provides the rendered output data 52 to the display 18. The display 18, which may be a headphone jack, a speaker or speakers, an LCD video graphics display, an electro-luminance backlight video graphics display, etc., converts the rendered output data 52 into audible and/or visual information.

In other examples, the high-speed interface 28 may exchange audio data, video data, video graphics data, and/or text data with the video decoder 38, the memory stick 40, the wireless modem 42, and/or the camcorder image sensor 44. As such, the multiple function battery operated device 10 may function as a portable MP3 player/recorder, a personal DVD player/recorder, a personal CD player/recorder, etc.

The multimedia module 24 may also receive input signals 54 from the input device 22, which may be a microphone, a keypad, a video capture device (e.g., a digital camera or a digital camcorder), etc. Such input signals 54 may be video signals, audio signals, video graphics signals, and/or text signals. Upon receiving the input signals 54, the multimedia module 24, in conjunction with the processing module 30 executing a multimedia application, converts the input signals 54 into the generic digital format of the system-on-a-chip for storage in the on-chip memory or for providing to an external source via the high-speed interface 28.

As one of average skill in the art will appreciate, the system-on-a-chip may include a memory interface operably coupled to the bus 25 to coupled to a flash memory, or the like, to extend the memory of the battery operated device 10.

As such, in one embodiment, all of the video, video graphics, text, and/or audio data is stored in the on-chip memory and in another embodiment, the video, video graphics, text, and/or audio data is at least partially stored off-chip in the external memory and retrieved when needed.

As one of average skill in the art will further appreciate, when the handheld device 10 is not coupled to the host device, (i.e., it is in a battery powered mode) the processing module 30 executes a multimedia application 46 to detect the disconnection and to place the handheld device in a battery operation mode. In the battery operation mode, the processing module 30 retrieves, and subsequently executes, a set of operational instructions from the on-chip memory 32 to support the battery operational mode. For example, the battery operational mode may correspond to MP3 file playback, digital dictaphone recording, MPEG file playback, JPEG file playback, text messaging display, cellular telephone functionality, and/or AM/FM radio reception.

As one of average skill in the art will still further appreciate, due to the comprehensiveness of the system-on-a-chip 12, the battery-operated device 10 requires a minimal of additional components, thus reducing cost and complexity of the resulting device 10. Further, by including battery-optimizing techniques, the system-on-a-chip optimally consumes power to fully extend the life of the battery.

Figure 2:
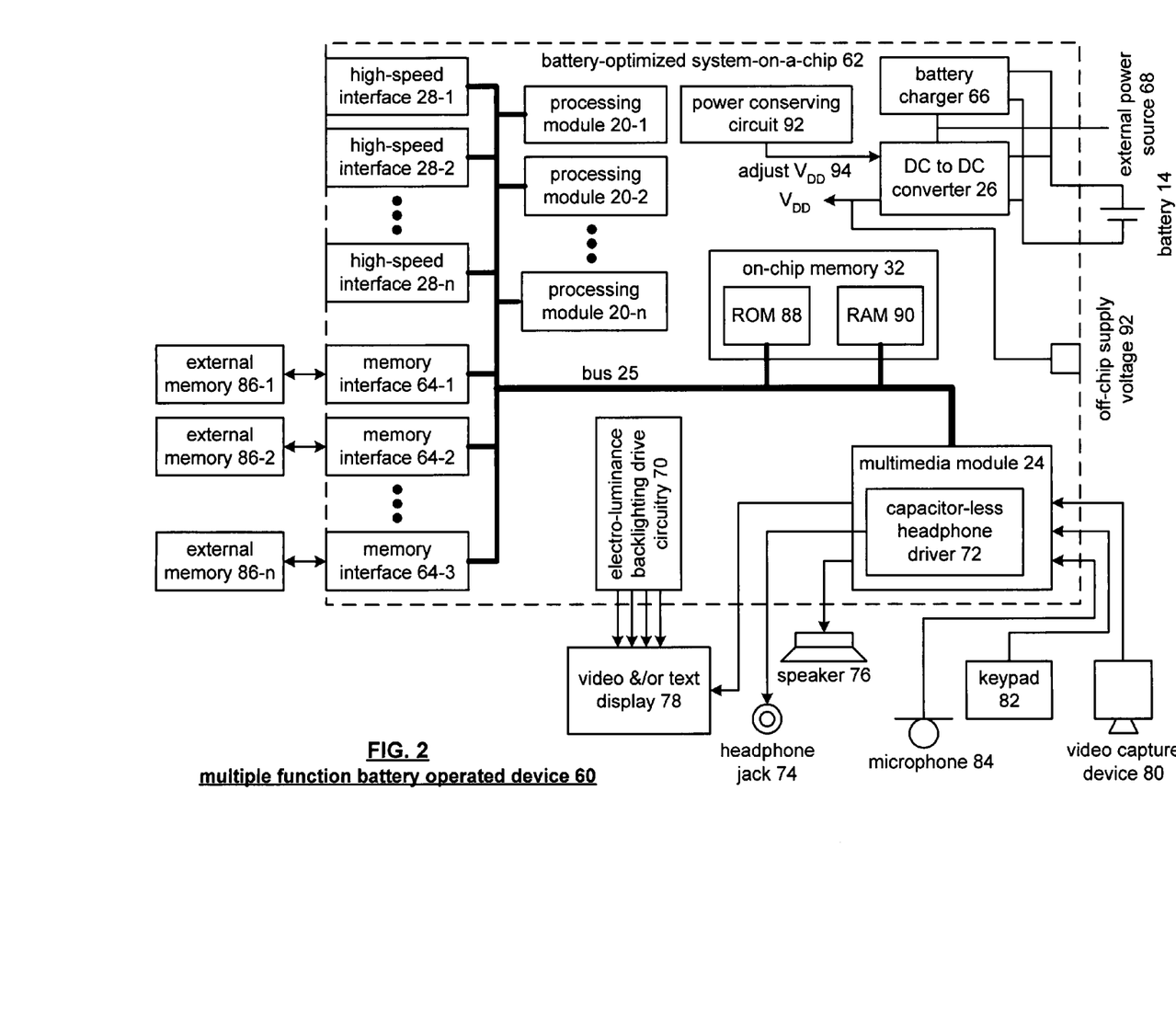
FIG. 2 is a schematic block diagram of another multiple function battery operated device that includes a battery-optimized system-on-a-chip in accordance with the present invention.

FIG. 2 is a schematic block diagram of another multiple function battery operated device 60 that includes a battery-optimized system-on-a-chip 62, a plurality of external memories 86, the battery 14, an external power source 68, a video and/or text display 78, a headphone jack 74, speaker(s) 76, a microphone 84, a keypad 82, and a video capture device 80. The battery-optimized system-on-a-chip 62 includes a plurality of high-speed interfaces 28, a plurality of memory interfaces 64, a plurality of processing modules 30, the DC-to-DC converter 26, a battery charger 66, the on-chip memory 32, the multimedia module 24, a power conserving circuit 92, which will be described in greater detail with reference to FIGS. 3–6, and a electroluminance backlighting drive circuitry 70. The multimedia module 24 includes a capacitor-less headphone driver 72. The on-chip memory 32 includes random access memory (RAM) 90 and read only memory (ROM) 88.

The plurality of high-speed interfaces 28-1 through 28-n allow the system-on-a-chip 62 to be simultaneously coupled to multiple external sources 34. The high-speed interfaces may utilize the same or different interface protocols. For example, all of the high-speed interfaces 28 may utilize a USB interface protocol, an Ethernet interface protocol, a fire-wire interface protocol, a serial/deserial interface protocol, etc. Alternatively, each high-speed interface 28-1 through 28-n may use a different interface protocol. For instance, high-speed interface 28-1 may support a USB interface, high-speed interface 28-2 may support Ethernet, and high-speed interface 28-n may support a fire-wire interface. One or more of the processing modules 30-1 through 30-n coordinates and arbitrates the high-speed interfaces 28 access to the bus 25.

The plurality of memory interfaces 64-1 through 64-n allow the system-on-a-chip 62 to be coupled to a plurality of external memory devices 86-1 through 86-n. The external memory devices 86-1 through 86-n may be NAND flash memory devices, NOR flash memory devices, and/or any other type of random access memory devices or read only memory devices. While executing one or more multimedia applications, one or more of the processing modules 30 coordinates the reading and/or writing of multimedia data to and from the external memory devices 86. For instance, one of the external memory devices 86 may store MP3 files for subsequent playback, another external memory device 86, may store video files (e.g., MPEG, JPEG, etc.) for subsequent playback, and another external memory device may store text and/or video graphics relating to operation of the device 60 and/or related to inputted data via the keypad 82, the video capture device 80, and/or one of the external sources 34.

Each of the external memory devices 86 may or may not be compliant with a memory interface standard. As such, the memory interfaces 64 include a flexible topology to accommodate the various types of external memory devices 86 that may be coupled to the system-on-a-chip 62. For a detailed discussion of the functionality of the memory interfaces 64 refer to co-pending patent application entitled FLEXIBLE MEMORY INTERFACE SYSTEM, having a filing date the same as the present patent application, having an attorney docket number of SIG000099. This co-pending patent application is hereby incorporated by reference.

The multimedia module 24 is operably coupled to receive input signals 54 from a microphone 84, a keypad 82, and/or a video capture device 80. The video capture device 80 may be a digital camera and/or a digital camcorder that supplies MPEG files, JPEG files, and/or other standardized format for still and/or motion digital images. The multimedia module 24 receives the digital video images from the video capture device 80 and either converts them into the generic format of the system-on-a-chip to produce generic video that are stored either in the on-chip memory 32 and/or in the external memory 86 or provides the digital video images to the bus 25 for storages in the on-chip memory 32 and/or in the external memory 86. One or more of the processing modules 30 coordinates the storing of the digital video images and whether the data will be converted to the generic format or not. The generic format may involve portioning packets of the video image into data words of a size corresponding to the bus width of the processing modules 30, storage word size of the on-chip or off-chip memory, and/or of the bus width of the bus 25.

The multimedia module 24 is also coupled to receive input signals 54 from the keypad 82. The keypad 82 may be a touch screen pad, a keyboard, voice recognition module, and/or any device that produces text messages. The multimedia module 24 receives the text messages from the keypad 82 and either processes them for display on the video and/or text display 78 or for storage in the RAM 90 and/or in the external memory 86. The processing of the text message may involve routing it to the video and/or text display 78, converting it to the generic format for storing in the RAM 90 or the external memory 86, or rendering it for display (i.e., converting text information into pixel information).

The multimedia module 24 is further coupled to receive input signals 54 from the microphone 84. The multimedia module 24 converts the analog audio input signals from the microphone 84 into digital audio input signals using an encoding scheme, such as pulse code modulation (PCM). The multimedia module 24 provides the digital audio signals to the RAM 90 and/or the external memory 86 for storage under the control of the processing module 30, which is executing an audio recording multimedia application 46. Accordingly, in this mode, the multiple function battery operated device 60 may function as a dictaphone.

The multimedia module 24 is operably coupled to provide analog audio signals to the speaker(s) 76 and/or to the headphone jack 74. The multimedia module 24 may generate the analog audio signals by performing a PCM decoding of digital audio signals stored in the on-chip memory 32 and/or stored in the external memory 86. The multimedia module 24 includes a driver, or multiple drivers, to supply the analog audio signals to the speaker(s) 76. The multimedia module 24 also includes the capacitor-less headphone driver 72 to supply the analog audio signals to the headphone jack. The capacitor-less headphone driver 72 reduces the number of external components by eliminating the need for coupling capacitors from the on-chip drivers to the headphone jack, wherein the coupling capacitors enabled level shifting of the analog audio signals from the driver level of 0.9 volts (e.g., AC ground for the left channel and right channel drivers) to 0 volts for the headphones. By reducing the number of required external components, the cost of producing a device 10 is reduced without sacrificing features and/or functionality.

The multimedia module 24 is further coupled to the video and/or text display 78, which may be an electro-luminance backlight display, an LCD display, or any other type of display that displays text, video graphics, and/or video images (still or motion). The multimedia module 24 receives digital video data from the on-chip memory and/or the external memory 86 under the control of the processing module 30, which is executing a text and/or video playback multimedia application. Upon receiving the digital video data, the multimedia module 24 converts it into pixel information (e.g., RGB, YUV, YCrCb, etc.), which is provided to the display 78.

If the display 78 is an electro-luminance backlight display, the system-on-a-chip includes the electro-luminance backlighting drive circuitry 70. In general, the electro-luminance backlighting drive circuitry 70 provides the control signals for the power transistors of the electro-luminance backlight display, thus eliminating the need for an extra integrated circuit to generate the control signals. By eliminating the need for an extra integrated circuit, the cost of producing a device 10 is reduced without sacrificing features and/or functionality.

The battery charger 66 is operably coupled to charge the battery 14 when the external source 68 is coupled to the device 10. The external source 68 may be a 5 volt supply that is received via a USB connection to a host computer or other external source having a USB connection. The details of the battery charger 66 are described in co-pending patent application entitled TBD, having the same filing date as the present patent application, and having an attorney docket number of SIG000089 and co-pending patent application entitled TBD, having the same filing date as the present patent application, and having an attorney docket number of SIG000092.

Each of the processing modules 30-1 through 30-n may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Further, each of the processing modules may be performing separate multimedia applications and/or co-process a single multimedia application. Such multimedia applications 46 include, but are not limited to, audio playback, audio record, video playback, video record, storing text, displaying text, storing video graphics, file system transfer, and/or displaying video graphics.

The on-chip memory 32 is shown to include ROM 88 and RAM 90. The ROM 88 may store a boot algorithm to initiate the battery-optimized system-on-a-chip 62, video graphics data, and/or any other system level data that should not be overwritten. The RAM 90 may be used as a first and/or second level cache memory for the processing modules 30 and may range from a few hundred kilobits to several hundreds megabits of storage capacity.

Figure 3:
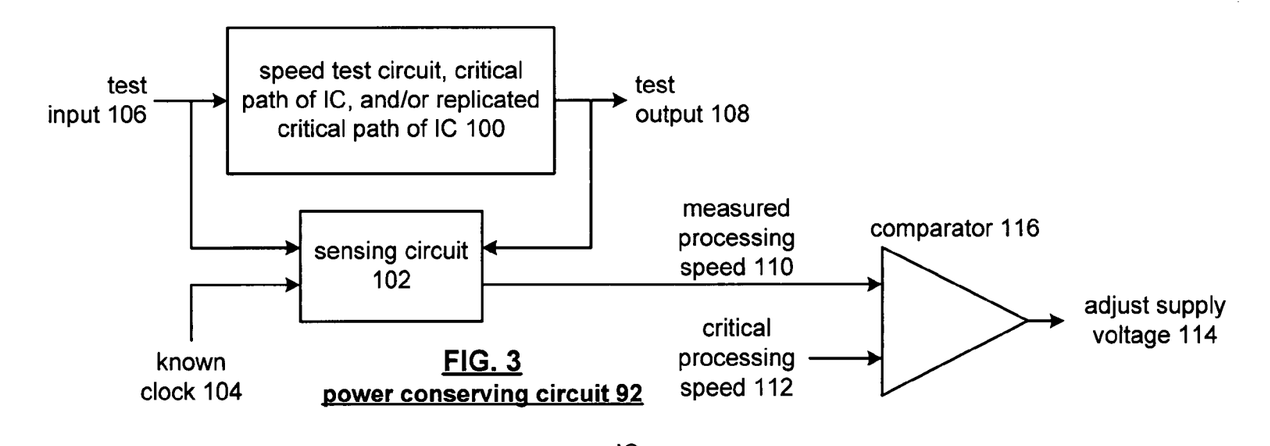
FIG. 3 is a schematic block diagram of a power conserving circuit in accordance with the present invention.

FIG. 3 is a schematic block diagram of a power conserving circuit 92 that includes a portion of an IC 100, a sensing circuit 102, and a comparator 116. The portion of the IC 100 may be a speed test circuit (e.g., a plurality of gates interoperably coupled, an adder, a multiplier, ring oscillator, etc.), a critical path within the IC (e.g., the path in the IC have the greatest amount of delay), and/or a replica of the critical path within the IC.

In operation, the portion of the IC 100 receives a test input 106, which may be a single bit of data, an enable signal, and/or multiple bits of data having a known pattern. The sensing circuit 102 determines when the portion of the IC 100 receives the test input 106 with respect to a known clock 104. The sensing circuit 102 monitors the output of the portion of the IC 100 to determine when the test output 108 is produced. When the test output 108 is detected, the sensing circuit 102 determines the number of cycles of the known clock 104 that has passed between the portion of the IC 100 receiving the test input 106 and it producing the test output 108 to produce a count value. Alternatively, the sensing circuit 102 counts the number of iterations of performing the function during a clock cycle (e.g., how many oscillations of a ring oscillator occur during a clock cycle) to determine a count value. The sensing circuit 102 converts the count value into a measured processing speed 110 of the portion of the IC 100. For example, if the test circuit is a ring oscillator, i.e., a plurality of inverters coupled in cascaded fashion, the rise and fall times can be determined based on the number of iterations in a clock cycle, where the rise and fall times can be used to determine the processing speed. The comparator 116 compares the measured processing speed 110 with a critical processing sped 112 to determine whether the supply voltage can be adjusted 114 and by how much. In general, the critical processing speed 112 corresponds to the time during which the portion of the IC must perform its function in order to avoid a timing error in the system-on-a-chip. If the measured processing time is less than the critical processing time, the supply voltage may be decreased, which slows the processing speed of the portion of the IC 100 but also reduces power consumption of the IC. This concept is graphically illustrated in FIGS. 4 and 5.

Figure 4:
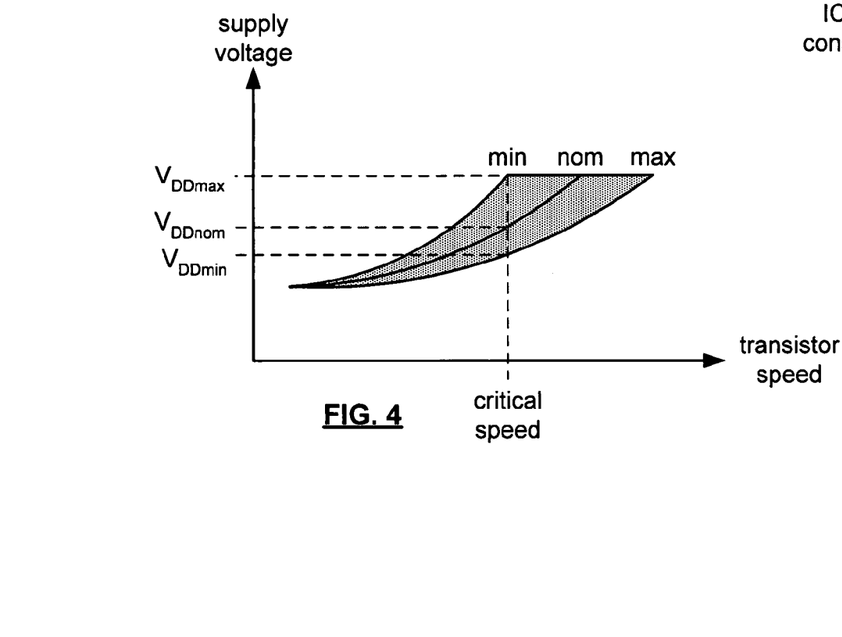
FIG. 4 is a graph of supply voltage versus transistor speed in accordance with the present invention.

FIG. 4 illustrates a graph that plots supply voltage versus transistor speed, which is a key factor in determining the speed of the portion of the IC 100. As shown, from IC to IC and/or over temperature, the transistor speed with respect to supply voltage can vary. Ideally, it is desired to set the supply voltage such that the speed of the transistor (e.g., rise and fall times) is at the critical speed or slightly above the critical speed. As shown, however, the speed to supply voltage may vary from IC to IC and within the same IC as the operating temperature of the IC changes. For instance, in a lot of ICs, most ICs will have the nominal curve, while a few will have the minimum curve and a few will have the maximum curve. Without the power conserving circuit 92, the supply voltage for all of the all ICs in this lot and in other lots would have to be set to handle the worst-case condition, where the critical processing speed is only achieved with a maximum supply voltage. As such, even though most of the ICs have a better speed to supply voltage ratio, they are operated based on the worst-case condition. Thus, they consume more power than necessary to perform their specific function since IC power consumption increases non-linearly as the supply voltage increases shown in FIG. 5.

Figure 5:
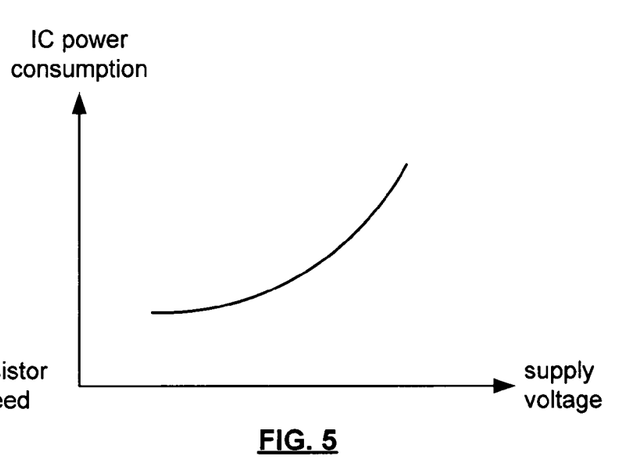
FIG. 5 is a graph of IC power consumption versus supply voltage in accordance with the present invention.

The power conserving circuit 92 adjusts the supply voltage on a chip-by-chip basis such that the speed of the transistor is maintained at a rate just above the critical speed. Thus, some ICs will require the supply voltage to be set at or near the maximum level, some ICs will be able to have the supply voltage set at or near the minimum level, while most will have the supply voltage set somewhere between the maximum and minimum values. Accordingly, by lowering the supply voltage for an individual IC, the power consumption for the IC is minimized.

Figure 6:
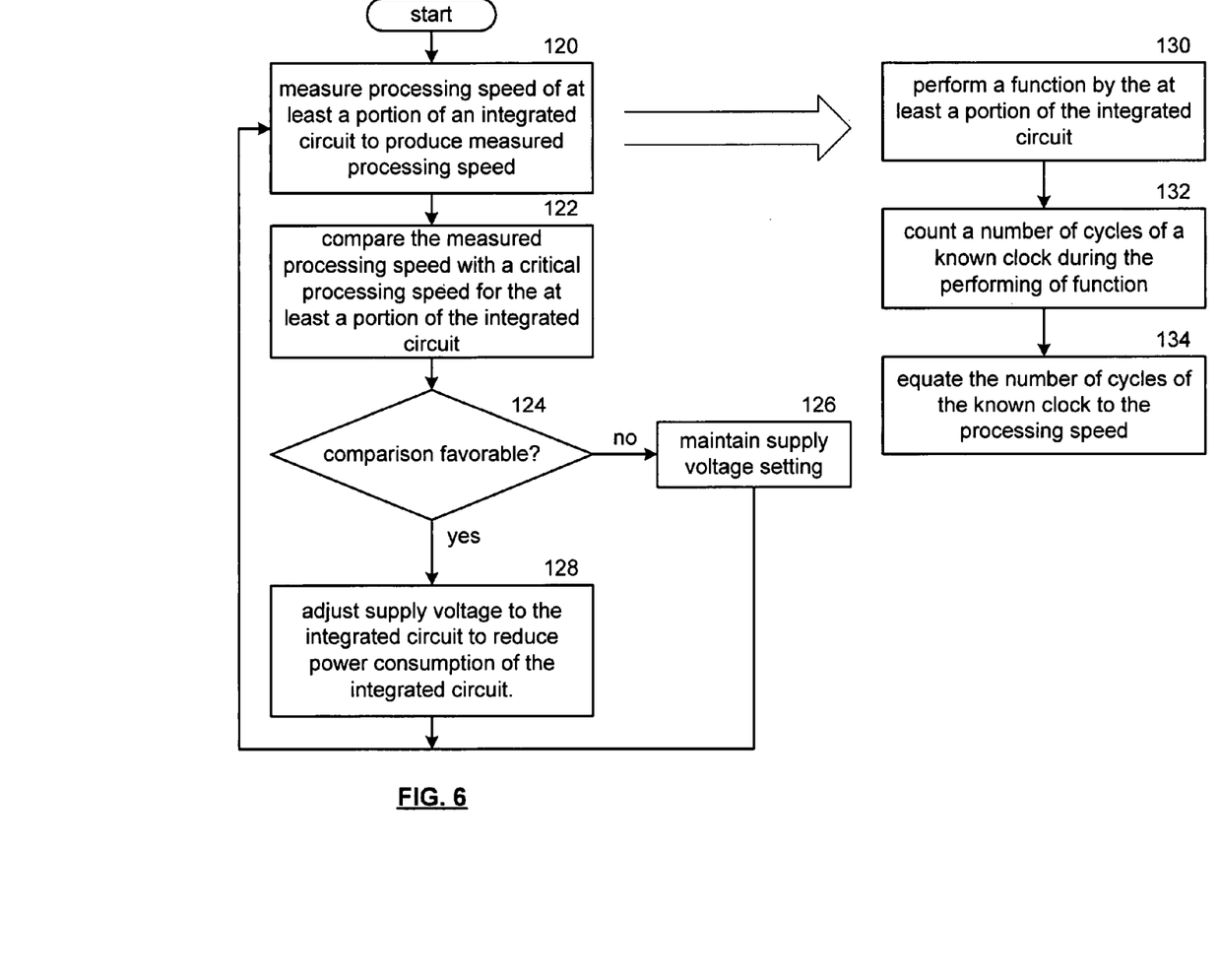
FIG. 6 is a logic diagram of a method for conserving power in accordance with the present invention.

FIG. 6 is a logic diagram of a method for conserving power of a system-on-a-chip that begins at step 120 where processing speed of at least a portion of an integrated circuit is measured to produce measured processing speed. The at least a portion of the integrated circuit includes a speed test circuit, a critical path of the integrated circuit, and/or a replicated circuit of the critical path of the integrated circuit. The measuring of the processing speed may be done as shown in steps 130–134. At step 130, the at least a portion of the integrated circuit performs a function, which may be, but is not limited to, an add function, a delay line function, a ring oscillation function, a memory retrieval function, and/or a multiplication function. The process then proceeds to step 132 where a number of cycles of a known clock are counted during the performing of function by the at least a portion of the integrated circuit or the number of iterations, or repetitions, of performing the function during a clock cycle to produce a count value. The process then proceeds to step 134 where the count value is equated to the processing speed.

Returning to the main path of the logic diagram, the process continues at step 122 where the measured processing speed is compared with a critical processing speed for the at least a portion of the integrated circuit. The process then proceeds to step 124 where a determination is made as to whether the comparison was favorable. If not, the process proceeds to step 126 where the supply voltage is maintained at its current setting, which initially may be set at its maximum value.

If the measured processing speed compared favorably to the critical processing speed, the process proceeds to step 128 where the supply voltage to the integrated circuit is adjusted to reduce power consumption of the integrated circuit. In one embodiment, the adjusting of the supply voltage may be done by determining a ratio between the measured processing speed and the critical processing speed and proportionally adjusting the supply voltage based on the ratio. In another embodiment, the adjusting the supply voltage may be done by adjusting level of sensing the supply voltage for regulation of an on-chip DC-to-DC converter that produces the supply voltage, or adjusting a reference voltage used for regulation of the on-chip DC-to-DC converter that produces the supply voltage. As one of average skill in the art will appreciate, the measuring, comparing, and adjusting to update the supply voltage may be periodically performed.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for conserving power on an IC-by-IC basis. In general this is achieved by measuring the processing speed of the IC, comparing the measured processing speed with a critical processing speed, and if the measured processing speed is faster than the critical processing speed, decreasing the supply voltage such that the actual processing speed approaches the critical processing speed. As one of average skill in the art will appreciate, other embodiments may be derived from the teachings of the present invention without deviating from the scope of the claims.

What is claimed is:

1. A method for conserving power, the method comprises:
    measuring processing speed of at least a portion of an integrated circuit to produce measured processing speed;
    comparing the measured processing speed with a critical processing speed for the at least a portion of the integrated circuit; and
    when the measured processing speed compares favorably to the critical processing speed, adjusting supply voltage to the integrated circuit to reduce power consumption of the integrated circuit.

2. The method of claim 1, wherein the measuring for the processing speed further comprises:
    performing a function by the at least a portion of the integrated circuit;
    counting at least one of a number of cycles of a known clock during the performing of function by the at least a portion of the integrated circuit and a number of repetitions of the function during a cycle of the known clock to produce a count value; and
    equating the count value to the processing speed.

3. The method of claim 2, wherein the performing the function further comprises at least one of:
    performing an add function;
    performing a delay line function;
    performing a memory retrieval function;
    ring oscillation function; and
    performing a multiplication function.

4. The method of claim 1, wherein the adjusting of the supply voltage further comprises:
    determining a ratio between the measured processing speed and the critical processing speed; and
    proportionally adjusting the supply voltage based on the ratio.

5. The method of claim 1, wherein the adjusting the supply voltage further comprises at least one of:

adjusting level of sensing the supply voltage for regulation of an on-chip DC-to-DC converter that produces the supply voltage; and adjusting a reference voltage used for regulation of the on-chip DC-to-DC converter that produces the supply voltage.

6. The method of claim 1 further comprises:

periodically repeating the measuring, comparing, and adjusting to update the supply voltage.

7. The method of claim 1, wherein the at least a portion of the integrated circuit further comprises at least one of:

a speed test circuit;

a critical path of the integrated circuit; and a replicated circuit of the critical path of the integrated circuit.

8. An apparatus for conserving power, the apparatus comprises:

processing module; and memory operably coupled to the processing module, wherein the memory stores operational instructions that cause the processing module to:

measure processing speed of at least a portion of an integrated circuit to produce measured processing speed;

compare the measured processing speed with a critical processing speed for the at least a portion of the integrated circuit; and when the measured processing speed compares favorably to the critical processing speed, adjust supply voltage to the integrated circuit to reduce power consumption of the integrated circuit.

9. The apparatus of claim 8, wherein the memory further stores operational instructions that cause the processing module to measure the processing speed by:

performing a function by the at least a portion of the integrated circuit;

counting at least one of a number of cycles of a known clock during the performing of function by the at least a portion of the integrated circuit and a number of repetitions of the function during a cycle of the known clock to produce a count value; and equating the count value to the processing speed.

10. The apparatus of claim 9, wherein the memory further stores operational instructions that cause the processing module to perform the function as at least one of:

performing an add function;

performing a delay line function;

performing a memory retrieval function;

ring oscillation function; and performing a multiplication function.

11. The apparatus of claim 8, wherein the memory further stores operational instructions that cause the processing module to adjust of the supply voltage by:

determining a ratio between the measured processing speed and the critical processing speed; and proportionally adjusting the supply voltage based on the ratio.

12. The apparatus of claim 8, wherein the memory further stores operational instructions that cause the processing module to adjust the supply voltage by at least one of:

adjusting level of sensing the supply voltage for regulation of an on-chip DC-to-DC converter that produces the supply voltage; and adjusting a reference voltage used for regulation of the on-chip DC-to-DC converter that produces the supply voltage.

13. The apparatus of claim 8, wherein the memory further stores operational instructions that cause the processing module to:

periodically repeat the measuring, comparing, and adjusting to update the supply voltage.

14. The apparatus of claim 8, wherein the at least a portion of the integrated circuit further comprises at least one of:

a speed test circuit;

a critical path of the integrated circuit; and a replicated circuit of the critical path of the integrated circuit.

15. A comprehensive system-on-a-chip comprises:

a processing core operably coupled to process input digital data and produce therefrom output digital data;

digital interface circuitry operably coupled to provide the input digital data to the processing core and to receive the output digital data from the processing core;

mixed signal circuitry operably coupled to convert input analog signals into the input digital data and to convert the output digital data into output analog signals; and battery optimization circuitry that includes a DC-to-DC converter and a power conservation circuit, wherein the DC-to-DC converter is operably coupled to convert a battery voltage into a supply voltage that supplies at least one of: the processing core, the digital interface circuitry, and the mixed signal circuitry, wherein the power conservation circuit includes:

processing module; and memory operably coupled to the processing module, wherein the memory stores operational instructions that cause the processing module to:

measure processing speed of at least a portion of the comprehensive system-on-a-chip to produce measured processing speed;

compare the measured processing speed with a critical processing speed for the at least a portion of the integrated circuit; and when the measured processing speed compares favorably to the critical processing speed, adjust supply voltage to at least one of the processing core, the digital interface circuitry, and the mixed signal circuitry to reduce power consumption of the comprehensive system-on-a-chip.

16. The comprehensive system-on-a-chip of claim 15, wherein the memory further stores operational instructions that cause the processing module to measure the processing speed by:

enabling a function to be performed by the at least a portion of the comprehensive system-on-a-chip;

counting at least one of a number of cycles of a known clock during the performing of function by the at least a portion of the integrated circuit and a number of repetitions of the function during a cycle of the known clock to produce a count value; and equating the count value to the processing speed.

17. The comprehensive system-on-a-chip of claim 16, wherein the memory further stores operational instructions that cause the processing module to enable the performing of the function as at least one of:

enabling performance of an add function;

enabling performance of a delay line function;

enabling performance of a memory retrieval function;

enabling performance of a ring oscillation function; and enabling performance of a multiplication function.

18. The comprehensive system-on-a-chip of claim 15, wherein the memory further stores operational instructions that cause the processing module to adjust of the supply voltage by:
   determining a ratio between the measured processing speed and the critical processing speed; and
   proportionally adjusting the supply voltage based on the ratio.

19. The comprehensive system-on-a-chip of claim 15, wherein the memory further stores operational instructions that cause the processing module to adjust the supply voltage by at least one of:
   adjusting level of sensing the supply voltage for regulation of the on-chip DC-to-DC converter; and
   adjusting a reference voltage used for regulation of the on-chip DC-to-DC converter.

20. The comprehensive system-on-a-chip of claim 15, wherein the memory further stores operational instructions that cause the processing module to:
   periodically repeat the measuring, comparing, and adjusting to update the supply voltage.

21. The comprehensive system-on-a-chip of claim 15, wherein the at least a portion of the comprehensive system-on-a-chip further comprises at least one of:
   a speed test circuit;
   a critical path of the comprehensive system-on-a-chip; and
   a replicated circuit of the critical path of the comprehensive system-on-a-chip.

* * * * *